United States Patent [19]

Miller

[11] 4,276,069
[45] Jun. 30, 1981

[54] FILTER ARRANGEMENT

[75] Inventor: David L. Miller, Louisville, Ky.

[73] Assignee: American Air Filter Company, Inc., Louisville, Ky.

[21] Appl. No.: 75,172

[22] Filed: Sep. 12, 1979

[51] Int. Cl.³ .............................................. B01D 46/02
[52] U.S. Cl. ..................................... 55/379; 55/502; 55/507; 55/509
[58] Field of Search ................ 55/375, 378, 379, 502, 55/507, 509; 210/323 T, 459

[56] References Cited

U.S. PATENT DOCUMENTS

| 3,377,783 | 4/1968 | Young | 55/379 |
| 3,812,660 | 5/1974 | Vandenhoeck | 55/378 |
| 4,073,632 | 2/1978 | Reinauer et al. | 55/379 |

FOREIGN PATENT DOCUMENTS

| 2846454 | 4/1979 | Fed. Rep. of Germany | 55/375 |
| 966235 | 8/1964 | United Kingdom | 55/378 |
| 1331417 | 9/1973 | United Kingdom | 55/378 |
| 2001259 | 1/1979 | United Kingdom | 55/378 |
| 1549170 | 7/1979 | United Kingdom | 55/378 |

Primary Examiner—David L. Lacey
Attorney, Agent, or Firm—Thomas G. Anderson

[57] ABSTRACT

A filter bag support member for fastening a filter bag to an apertured bag header plate member disposed between the dirty gas inlet and the clean gas outlet of a filter bag housing comprising a flow-through venturi-like tube having one end releasably fastened to the plate member and a clamp at the other end receiving the filter bag in supporting sealed relation.

10 Claims, 3 Drawing Figures

FILTER ARRANGEMENT

BACKGROUND OF THE INVENTION

1. Field of Invention

The present invention relates to gas separation devices and in particular to a filter arrangement adapted to be connected to an apertured header plate member.

2. Description of the Prior Art

The prior art includes a variety of filter arrangements adapted to be releasably connected to an apertured plate member. Typically, each arrangement includes a tubular filter medium having one end connected to an apertured support plate, a retainer extending within the filter to prevent inadvertant collapse or failure of the filter, and a venturi proximate the end of the filter adapted to receive and direct pulsed gases into the filter during filter cleaning operations. This type of arrangement, which usually requires the use of tools to install and remove, has generally been relatively cumbersome and often difficult for a workman to handle during on-site repair or replacement of the filter medium.

SUMMARY OF THE INVENTION

The present invention relates to a gas separation device and in particular to a filter arrangement adapted to be connected to an apertured header plate member in flow-through communication with the plenum of a bag house or related gas filtration system.

The filter arrangement includes a tubular bag support member formed of a relatively rigid resilient material having a conduit providing a venturi extending through the member. A flexible collar is provided at one end of the member which is adapted to embrace the marginal edge of the plate aperture to removably secure the member to the plate. The other or distal end of the member extends into one end of a tubular filter which is secured to the member by a clamp gathering it into sealing supporting engagement with the member. The invention also provides that each end of the member include an annular channel axially aligned about the conduit extending through the member. Each channel is adapted to receive a relatively rigid ring member which reinforces and thus rigidifies the support member. This is particularly desirable when the filter arrangement is used in relatively high temperature applications where softening of the material forming the mounting member could otherwise result in the collar slipping out of the plate aperture.

From the foregoing, it can be seen that the invention provides a convenient and easily maintained filter arrangement which permits rapid repair and replacement of the filter medium in a gas filtration system, it being understood that various changes can be made in the arrangement, form and construction of the apparatus disclosed herein without departing from the spirit and scope of the invention.

DESCRIPTION OF THE PREFERRED EMBODIMENT

Figure 1:
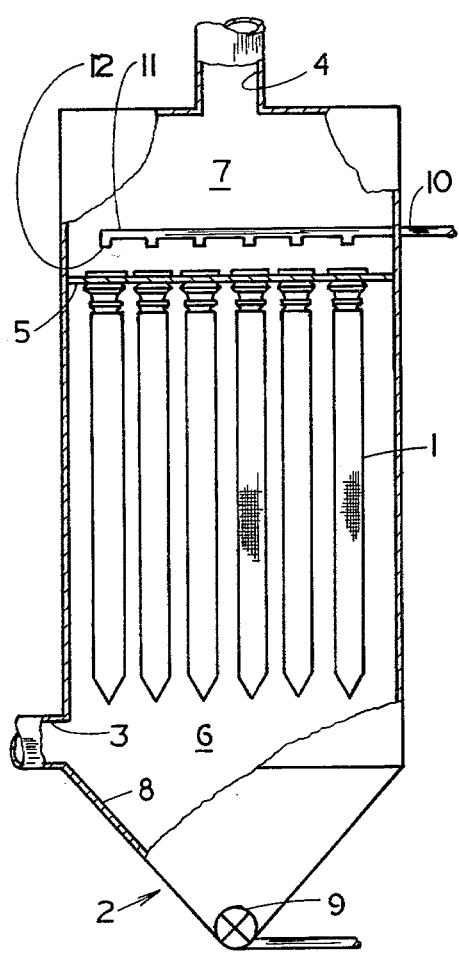
FIG. 1 is a side elevational view of a bag house, partially in section, embodying the invention.

As shown in FIG. 1, a plurality of filter arrangements 1 embodying the present invention are adapted to be secured in a filter housing or bag house 2 having a dirty gas inlet 3 and a clean gas outlet 4. The bag house 2 includes a transversely extending apertured header plate or tube sheet 5 which divides the bag house 2 into a dirty gas cleaning chamber 6 and a clean gas take-off chamber or plenum 7. As will be described, the header plate 5 supports the tubular filter arrangements 1 within the dirty gas chamber 6 such that when dirty gas is directed through the inlet 3 into the cleaning chamber 6, it passes through the filter arrangements 1 and leaves the filter housing through the plenum 7 and the clean gas outlet 4. Particulate material separated from the dirty gas and deposited on the exterior of each filter is collected in a suitable hopper 8 positioned below the dirty gas chamber 6, and this material is in turn removed from the hopper through the discharge outlet 9 as is well known in the art. To accommodate cleaning of the filters, the filter housing includes a valve controlled reverse flow flushing arrangement 10. As shown schematically in FIG. 1, the flushing arrangement 10 includes an inlet pipe 11 connected to a source of compressed air (not shown) and has air injection nozzles or orifaces 12 positioned above each of the filter arrangements 1 to inject jets or pulses of air into each filter during filter cleaning operations.

Figure 2:
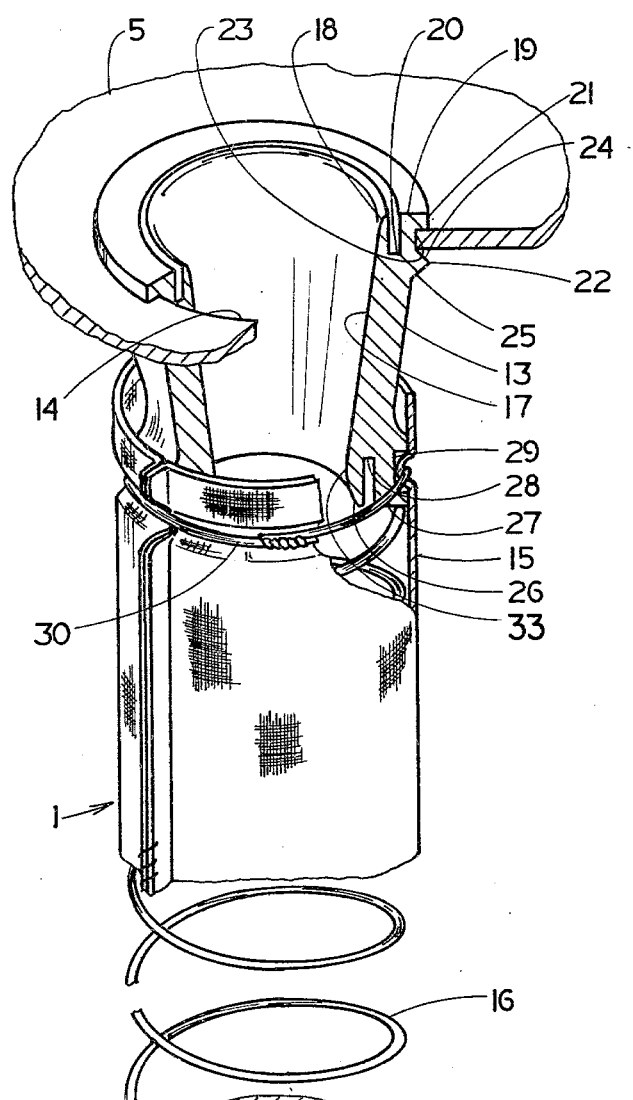
FIG. 2 is an enlarged isometric view, partially in section, showing the filter arrangement mounted on the plate member as shown in FIG. 1.

Each of the filter arrangements 1 includes a selectively contoured tubular mounting or filter support member 13 adapted to be removably secured in a complementally sized aperture 14 in the tube sheet 5 at its upper end, and the lower end of the member 13 carries a gas permeable tubular filter bag or medium 15. Additionally, to prevent inadvertant collapse or failure of the filter bag 15 during gas cleaning operations as well as to accentuate shaking of the filter medium during filter pulsing or cleaning, a helical spring 16 is provided within the filter as shown in FIG. 2.

The support member 13 is formed of a relatively rigid resilient material and is preferably of a generally frustoconic configuration to define a conduit 17 shaped to provide a venturi extending through the member. As shown in the drawings, the wall thickness or transverse cross-sectional area of the member is substantially uniform along its length. This is believed to be particularly desireable since it facilitates injection molding of the member from materials such as synthetic rubber, polypropylene, polyvinylchloride, or related plastic polymers.

The upper portion of the support member 13 includes an outwardly extending annular lip 18 and an attachment collar 19 concentrically spaced about the lip 18 to define an axially disposed annular channel 20. The attachment collar 19 includes a pair of outwardly extending peripheral ridges or flanges 21 and 22 of a diameter slightly greater than the diameter of the plate aperture 14 and defining an external peripheral groove 23 sized to form a knife-edge type yielding seal securing the mounting member 13 to the marginal edge of the plate aperture 14. By this arrangement, the sizing of the groove effects compressive press-fit interfacial engagement between the facing surfaces of the ridges 21 and 22 and the upper and lower surfaces of the tube sheet 4, as well as between the base of the groove and the periphery of the aperture. Additionally, it should be noted that the ridge 22 is preferably formed with sloping surfaces 24 and 25 to guide and facilitate flexive snap-like insertion and removal of the mounting member in the plate aperture.

The lower or distal end of the mounting member 13 includes an annular shoulder 33 having an outwardly flared annular rim 26 and a depending sleeve portion 27 concentrically spaced about the rim 26 to define the annular channel 28. The sleeve 27 includes an external slot 29 about its periphery which is generally transversely aligned with the throat of the venturi. As shown in the drawings, the distal end of the mounting member extends into the end of the filter 15 which is secured by a wire 30 or other heat-set or mechanical compression clamping arrangement surrounding the filter to gather it in the slot 29 and thus secure the filter to the mounting member. Moreover, to accommodate removal of the filter arrangement from either side of the tube sheet, the invention provides that the outermost diameter of the sleeve 27 is less than the diameter of the plate aperture 14.

Figure 3:
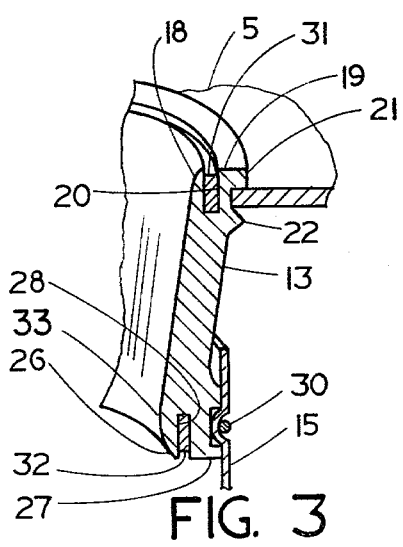
FIG. 3 is an enlarged partial isometric view showing an alternative embodiment of the invention.

As noted in the foregoing, the invention also contemplates use of the filter arrangement in relatively high temperature applications. Specifically, as provided in the alternative embodiment shown in FIG. 3, a pair of rigid metal rings 31 and 32 are secured in the channels 21 and 28 in a press-fit fashion to rigidify the member. Thus, this arrangement essentially eliminates the possibility of the collar slipping out of the plate aperture due to softening or shrinkage of the mounting member material at higher temperatures.

I claim:

1. A filter arrangement adapted to be secured to an apertured header plate disposed across a dirty gas stream between the dirty gas inlet and the clean gas outlet of a filter bag housing, comprising:
   a tubular filter;
   a filter bag support member integrally formed of a relatively rigid resilient material including a venturi-like tube section forming a venturi extending through the member;
   said member having a flexible collar portion at one end of the tube section for releasably securing the member to the apertured plate and an annular shoulder portion formed at the other end of the tube section extending into one end of the filter; and
   clamping means surrounding said one end of the filter and securing it to said shoulder portion in supporting sealing relation proximate the throat of the venturi extending through the member to provide a relatively unobstructed opening at said one end of the filter, thereby essentially minimizing pressure losses in the gas stream flowing through the filter.

2. The filter arrangement according to claim 1, and said collar portion having an external groove about its periphery sized to receive the marginal edge of an associated aperture in the plate to secure the support member to the plate.

3. The filter arrangement according to claim 1, and said clamping means releasably gathering said one end of the filter into supporting sealing engagement with said annular shoulder portion.

4. The filter arrangement according to claim 3, and said annular shoulder portion having an external slot about its periphery; and
   said slot receiving said one end of the filter and said clamping means.

5. The filter arrangement according to claim 1, and said support member being formed of a molded plastic polymeric material.

6. The filter arrangement according to claim 1, and filter retaining means sheathed within the filter and extending generally coextensively therewithin.

7. The filter arrangement according to claim 1, and said tube section including a central conduit portion having an axially extending annular lip at said one end; and
   said collar being disposed in concentrically spaced surrounding relation with said lip to define a continuous annular channel between said lip and the collar generally laterally aligned with the apertured plate.

8. The filter arrangement according to claim 7, and a rigid ring member releasably secured in said channel.

9. The filter arrangement according to claim 1, and said shoulder portion including an axially extending annular rim portion and an axially extending sleeve disposed in concentrically spaced surrounding relation with said rim portion to define a continuous annular channel between the rim portion and the sleeve generally laterally aligned with said clamping means.

10. The filter arrangement according to claim 1, and said tube section including a central conduit portion having an axially extending annular lip at said one end and an axially extending annular rim portion at said other end;
    said collar portion extending from said conduit portion in concentrically spaced surrounding relation with said lip to define a first annular channel between said lip and the collar portion generally laterally aligned with the apertured plate;
    a sleeve at the other end of said conduit portion disposed in concentrically spaced surrounding relation with said rim portion to define a second annular channel between the rim portion and the sleeve generally laterally aligned with said clamping means;
    a rigid ring member releasably secured in each of said channels; and
    said clamping means being in substantially lateral alignment with said second channel connecting said one end of the filter with said sleeve.

* * * * *